United States Patent [19]

Vivier

[11] Patent Number: 4,504,506
[45] Date of Patent: Mar. 12, 1985

[54] METHOD FOR CHOPPING OLIVES

[76] Inventor: Edward H. Vivier, 3350 Harvard, Visalia, Calif. 93277

[21] Appl. No.: 416,264

[22] Filed: Sep. 9, 1982

[51] Int. Cl.³ .......................... A23N 4/08; A47J 23/00
[52] U.S. Cl. ...................................... 426/485; 99/565; 241/7; 241/9; 241/14; 241/86; 426/518
[58] Field of Search .............. 426/483, 485, 615, 627, 426/482, 518; 241/14, 7–9, 73, 74; 99/565, 566, 539, 537

[56] References Cited

U.S. PATENT DOCUMENTS

| 136,002 | 2/1873 | Olds | 99/565 |
|---|---|---|---|
| 717,245 | 12/1902 | Morris et al. | 99/565 |
| 879,440 | 2/1908 | Carothers | 99/565 |
| 909,306 | 1/1909 | Kern | 241/74 |
| 1,047,970 | 12/1912 | Miller | 241/73 |
| 1,361,765 | 12/1920 | Jennings | 99/566 |
| 1,469,460 | 10/1923 | Strizzi | 241/73 |
| 1,621,823 | 3/1927 | Ayres | 241/73 |
| 1,683,705 | 9/1928 | Schmidt | 241/74 |
| 1,943,150 | 1/1934 | Stoico | 241/73 |
| 2,516,963 | 8/1950 | Derbenwick et al. | 99/565 |
| 2,690,197 | 9/1954 | King | 241/73 |

OTHER PUBLICATIONS

Commercial Fruit & Vegetable Products, p. 212, Cruess, McGraw-Hill, 1948, 3rd Ed.

Primary Examiner—Steven Weinstein
Attorney, Agent, or Firm—Christie, Parker & Hale

[57] ABSTRACT

A method for chopping olives comprises feeding olives into an abrading zone in a pulper having at least one rotatable brush which clears a screen extending around the periphery of the abrading zone. The brush is rotated to abrade the olive meat between the brush, the screen, and the pits from the olives. The product passing through the screen is collected and has a uniform character and is essentially pit free. The pit caps are separated from the olive pits by this process and shredded through the screen.

12 Claims, 2 Drawing Figures

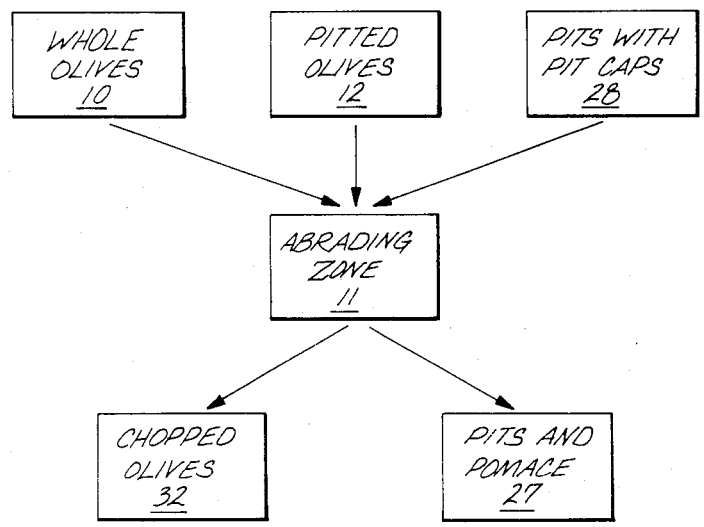
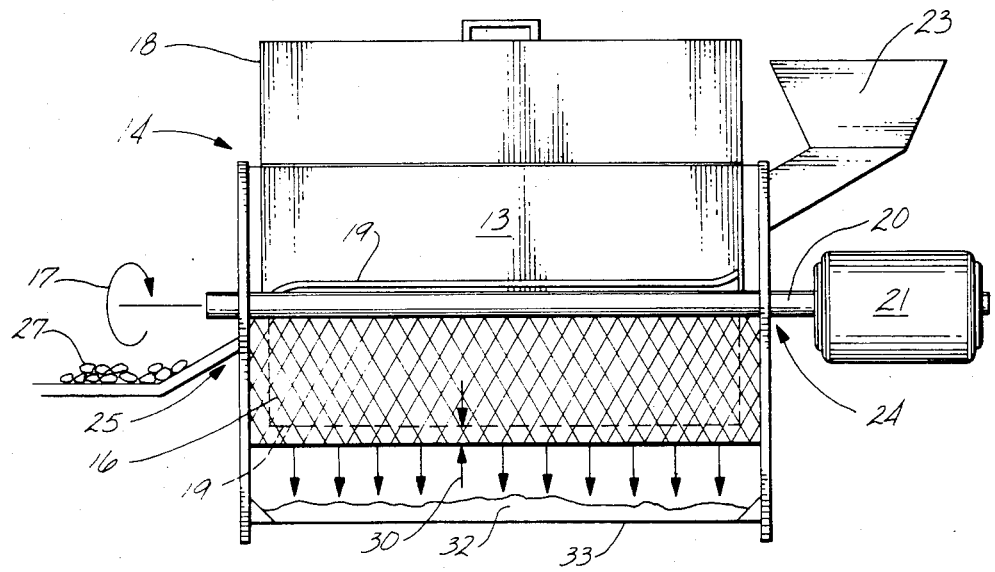

METHOD FOR CHOPPING OLIVES

FIELD OF THE INVENTION

This invention discloses techniques for preparing a chopped olive product which has uniform character.

BACKGROUND OF THE INVENTION

Chopping olives is an important method for salvaging less than top grade whole olives. In one method, the olives are first pitted and then fed into an Elliot-type chopper. In such a machine, the olives are chopped by stainless steel circular knives running against a rubber coated pulley. As the olives pass by the knives, they are diced in random sizes. Consequently, the olive product does not have an even character. The different sizes result in a "C" USDA grade product.

There are several other problems with chopping olives using an Elliot-type chopper. An Elliot chopper will tend to break pits so that it is possible to get five centimeter or larger pit fragments mixed with the finished product. Although most such fragments can be removed by a brine flotation process, consumers occasionally will break teeth on some of the smaller pit fragments which leads to product liability lawsuits and settlement payments.

There is a nub of meat attached to the olive pit called the pit cap. This is a potentially usable product which currently is not completely recovered by processes using an Elliot-type chopper machine. Instead, the pit cap is left on the pits when the olives are originally pitted and eventually become waste material.

There is need for a method for chopping olives which produces a product having an even character. The need extends to a method that avoids breaking olive pits and introducing pit fragments into the product.

SUMMARY OF THE INVENTION

This invention provides a method for chopping olives. Olives are fed into an abrading zone in a pulper. A suitable pulper comprises a screen and a rotatable brush or paddle. The screen extends at least partially around the periphery of the abrading zone and has openings from about ¼ inch to about ⅜ inch wide. The rotatable brush clears the screen by about ⅛ inch.

The brushes are rotated from about 290 rpm (revolutions per minute) to about 450 rpm to abrade the olives and force the chopped olive meat through the screen. The chopped olive product is collected from outside the screen.

The chopped olive product provided by this method has a uniform character and contains essentially no pit fragments.

The invention also provides a method for removing pit caps comprising an olive meat from olive pits. The method comprises feeding olive pits with the pit caps attached into the abrading chamber in the pulper, rotating the paddle from about 290 rpm to about 450 rpm to remove pit caps from the olive pits and to force pit caps to pass through the screen, and collecting the chopped pit caps from outside the screen.

The invention also provides a method for abrading olive meat comprising feeding a starting material comprising olive meat and olive pits into the abrading zone of the pulper, rotating the paddle to abrade the olive meat between the paddle, the screen, and the olive pits, and collecting abraded olive meat from outside the screen.

DESCRIPTION OF THE DRAWINGS

These and other features and advantages of the invention will be more readily understood by reading the following detailed description with the attached drawings, where:

FIG. 1 is a block diagram outlining a method for chopping olives according to this invention; and FIG. 2 is an elevational view of an olive chopping machine suitable for practicing the method of this invention.

DETAILED DESCRIPTION

Olives 10 are fed into an abrading zone 11 which preferably comprises a chamber 13 contained in a pulping machine 14. An exemplary suitable pulping machine has a cylindrical abrading chamber with a screen 16 extending at least partially around the periphery of the chamber. The chamber has the shape of a right circular cylinder with a central longitudinal axis 17. At least one, preferably a plurality of paddles 19 are mounted for rotation on a central shaft 20 which is concentric with the axis 17. The shaft is driven by an electric motor 21 which has a variable speed control.

The starting material is fed into a hopper 23 and enters the chamber 13. The paddles extend horizontally through the length of the chamber and are curved inwardly at the feed end 24. The inward curving is in the sense of rotation of the paddles so that the paddles upon rotation tend to draw the product through the chamber. At the opposite or discharge end 25 the paddles are curved in a backward direction to force the olive pits 27 through a discharge port. If desired, each paddle may include bristles and take the form of a brush.

The clearance 30 between the edge of the paddles and the screen is preferably about ⅛ inch. The paddles can comprise beater blades or brushes having bristles.

The size of the screen is critical. For best results, the screen should have uniformly sized openings. The openings can be from about ¼ inch to about ⅜ inch wide. A screen having openings 5/16 inch wide is presently preferred for producing the most uniform product.

The paddles are rotated to abrade the olives between the paddles and the screen. The olive pits contained in the starting material help shred the olives. A shredded olive meat 32 is forced through the screen and falls by gravity into a collection bin 33 under the screen, from where it may be collected periodically. The rotation of the paddles causes essentially all the olive meat to be stripped off the olive pits. While the olive meat is forced through the screen, the olive pits and pomace 27 are recovered from the discharge end 25 of the pulper.

The speed of the rotating paddles or brushes is critical. Too fast a speed causes the shredded olive meat to extrude as a mushy product. On the other hand, too slow a speed causes the olives to roll intact out of the pulper without being shredded or without separating the olive meat from the olives. The speed of rotation of the paddles should be from about 290 rpm (revolutions per minute) to about 450 rpm.

The shredded olive meat 32 extruded through the screen has an even character. This means that the product has a consistent size that is determined largely by the size of the openings of the screen. The character of the chopped olive meat is sufficiently even so that the product, after one run through the screen, will qualify for an "A" grade rating from the United States Department of Agriculture criteria for canned products. Previous methods for chopping olives using Elliot-type choppers could produce at best a "C" grade product on a first run. If it was desired to upgrade the product, it was necessary to reintroduce it to the Elliot-type chopper for further refinement. However, a portion of the product would be lost each run and the cost of operating the equipment several times raised the final cost of the finished product.

By rotating the paddles between the critical speeds of about 290 rpm and about 450 rpm, the olive meat is shredded from the olive pits without breaking the pits. The product may contain pit fragments which as an upper limit are the size of a grain of sand. Accordingly, the extruded shredded olive meat 32 is a product which contains essentially no fragments of olive pits.

The pit cap, or the nub of the meat which is attached to the pit, is removed from the pit by the process of this invention. If whole olives are introduced as a starting material, the pit cap will be removed from the pit and recovered as a portion of the extruded shredded olive meat 32. This invention can also be practiced by introducing olive pits 28 with only the pit caps attached as the starting material in the hopper 23. The pit caps will be separated from the pits and recovered in the collection bin as abraded olive meat.

The olive pits serve a useful function by helping abrade the olive meat in the chamber 13, along with the brushes and the screen. The pits can be present in the chamber and will not degrade the product as they will not break or pass through the screen as long as the paddles are rotated between the critical speeds of from about 290 rpm to about 450 rpm. Instead, the pits are collected at the discharge end 25 and can be sold as a fuel for appropriate industrial applications.

Since the pits are readily separated from the olive meat, it is not necessary to resort to brine flotation methods or the like to separate the pits from the chopped olive product. Thus, the invention reduces the equipment and procedures necessary to process chopped olives and the product can therefore be produced at a lower cost.

The invention has the further advantage in that the shredding process is quite rapid and occurs at faster rates than previous methods for shredding olives using, for example, Elliot-type choppers. The practice of this invention can increase the rate of processing olives by as much as three times over previous methods. Consequently, in a given period of time, it is possible to process up to three times a greater volume of product by practicing this invention than by using previously known methods for chopping olives. Moreover, the new product has an even character and is a higher quality grade product than was previously available.

By using the new chopping process an increase in product yield of up to about 20% can be realized. The increase is believed due to completely removing olive material from the pits. The old style Elliot choppers never completely removed all material from the olive pits.

The screen extends at least partially around the periphery of the abrading chamber. A screen extending completely around the periphery can be used, but presents the possibility of hanging the product in the upper parts of the screen, as the product is collected by gravity in the collection bin 33 below the screen. Accordingly, it is advantageous to employ a screen which extends only around the lower region of the abrading chamber below the rotational axis 17. The extent of such a screen is sufficient to effect full separation of the olive meat from the pits, and full shredding and extrusion of the olive meat through the screen. On the other hand, with such a screen, buildup of product in the upper region of the screen above the rotational axis and possible decomposition and contamination of the product are avoided.

It is not necessary to use a hopper to feed the starting material into the abrading chamber. In certain applications it may be more convenient to feed the starting material into the pulper with a conventional product pump or conveyor belt or auger conveyor. In such applications, a moderate volume of water can be added to the starting material to facilitate movement of the material into the abrading chamber.

This invention has been described in the context of the presently preferred method for producing a chopped olive product. While the invention has been illustrated in the context of a pulping machine having a cylindrical abrading chamber, it will be appreciated that the geometry of the chamber can be modified without materially altering the body of the finished product. For example, an abrading chamber could have a spherical shape and utilize semicircular paddles. It is not intended that the description serve as a catalog exhausting all forms which this invention may take. Workers skilled in the art will appreciate that variations in the procedures described above may be made while still relying on essential aspects of this invention.

What is claimed is:

1. A method for chopping olives comprising:
   feeding whole olives into an abrading zone in a pulper, the pulper comprising a screen extending at least partially around the periphery of the abrading zone, the screen having openings from about ¼ inch to about ⅜ inch wide, the pulper also comprising a rotatable paddle set at a height of about ⅛ inch off the screen;
   rotating the paddle from about 290 rpm to about 450 rpm to abrade the olives between the paddle and screen and force a chopped olive meat in the form of shredded olive pieces of substantially uniform size through the sceen, while separating the olive pits from the chopped olive meat; and
   collecting the chopped olive meat from outside the screen.

2. a method according to claim 1 wherein the chopped olive product contains essentially no pit fragments.

3. A method according to claim 1 wherein the paddle comprises a brush.

4. A method according to claim 1 in which the paddle is rotated about an axis substantially parallel to the face of the screen.

5. The method according to claim 1 in which the pit caps are removed from the pits as part of the chopped olive meat.

6. A method for removing pit caps comprising an olive meat from olive pits comprising:
   feeding olive pits with the pit caps attached into an abrading chamber in a pulper, the pulper having a screen extending at least partially around the periphery of the chamber, the screen having openings from about ¼ inch to about ⅜ inch wide, the pulper including at least one rotating paddle which upon rotation clears the screen by about ⅛ inch;

rotating the paddle from about 290 rpm to about 450 rpm to abrade the olive pits and pit caps between the paddle and screen and remove the pit caps from the olive pits and force pit caps to pass through the screen, while separating the olive pits from the pit caps; and collecting shredded pit cap material from outside the screen.

7. A method according to claim 6 including rotating the paddle about an axis substantially parallel to the face of the screen.

8. A method according to claim 6 in which the paddle comprises a brush.

9. A method for abrading olive meat comprising:

feeding a starting material comprising olive meat and olive pits into an abrading zone of a pulper, the pulper having a screen extending at least partially around the periphery of the abrading zone, the pulper including at least one rotatable paddle, wherein the screen has openings from about $\frac{1}{4}$ inch to about $\frac{3}{8}$ inch wide, and in which the paddle clears the screen by about $\frac{1}{8}$ inch during rotation;

rotating the paddle to abrade the olive meat between the paddle, the screen, and the olive pits to force abraded olive meat of substantially uniform particle size through the screen, while separating the olive pits from the abraded olive meat; and collecting abraded olive meat from outside the screen.

10. A method according to claim 9 wherein the starting material comprises whole olives.

11. A method according to claim 9 in which the paddle is rotated about an axis substantially parallel to the face of the screen.

12. A method according to claim 9 in which the paddle comprises a brush.

* * * * *

UNITED STATES PATENT AND TRADEMARK OFFICE
CERTIFICATE OF CORRECTION

PATENT NO. : 4,504,506
DATED : March 12, 1985
INVENTOR(S) : Ed Vivier

It is certified that error appears in the above-identified patent and that said Letters Patent is hereby corrected as shown below:

In the abstract, (57), lines 6 and 7, "the brush, the screen, and the pits from the olives" should read --the brush and screen, and remove the pits from the olives--.

Column 1, line 46, "5/8" should read--3/8--.
Column 2, line 42, "5/8" should read--3/8--.
Column 4, line 38, claim 1, "5/8 should read --3/8--;
        line 66, claim 6, "5/8 should read --3/8--.
Column 6, line 2, claim 9, "5/8" should read --3/8--.

Signed and Sealed this

Twenty-fourth Day of September 1985

[SEAL]

Attest:

Attesting Officer

DONALD J. QUIGG

Commissioner of Patents and
Trademarks—Designate